(12) United States Patent
Nemeth et al.

(10) Patent No.: US 8,855,244 B2
(45) Date of Patent: Oct. 7, 2014

(54) DIGITALLY DEMODULATING A MINIMUM-SHIFT KEYING (MSK) SIGNAL

(75) Inventors: József G. Nemeth, Budapest (HU); Péter Szilveszter Kóvács, Santa Clara, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 285 days.

(21) Appl. No.: 13/331,016

(22) Filed: Dec. 20, 2011

(65) Prior Publication Data

US 2012/0163509 A1    Jun. 28, 2012

Related U.S. Application Data

(60) Provisional application No. 61/426,900, filed on Dec. 23, 2010.

(51) Int. Cl.
    *H03D 3/00*     (2006.01)

(52) U.S. Cl.
    USPC ............ 375/336; 375/341; 375/305; 375/265

(58) Field of Classification Search
    USPC .................................. 375/336, 341, 305, 265
    See application file for complete search history.

(56) References Cited

U.S. PATENT DOCUMENTS

| | | | | |
|---|---|---|---|---|
| 5,844,946 | A | * | 12/1998 | Nagayasu ...................... 375/341 |
| 6,690,739 | B1 | * | 2/2004 | Mui ............................... 375/265 |
| 2007/0030926 | A1 | | 2/2007 | Brown et al. .................. 375/340 |
| 2009/0175384 | A1 | | 7/2009 | Perrins et al. ................. 375/324 |

OTHER PUBLICATIONS

International PCT Search Report and Written Opinion, PCT/US2011/066491, 10 pages, Mar. 15, 2012.

* cited by examiner

*Primary Examiner* — Kabir A Timory
(74) *Attorney, Agent, or Firm* — King & Spalding L.L.P.

(57) ABSTRACT

A two stage process is applied for recovering the modulating content from the received I-Q waveforms of a MSK modulated signal. In the first stage, at each incoming symbol the I-Q waveform segments of the input belonging to the three most recently received symbols are used in hypothesis testing. A matched filter bank produces ratings for each of the possible three symbol modulating patterns in proportion to the likelihood that the combination in question may have produced the current but by now impaired input segment. While the three symbol window slides symbol-by-symbol over the input the successive hypothesis tests are not independent as each symbol is involved in three consecutive tests. The dependence thus created lays the foundation and provides the branch metrics for applying the Viterbi algorithm for the determination of the modulating symbols in the second stage.

13 Claims, 9 Drawing Sheets

DIGITALLY DEMODULATING A MINIMUM-SHIFT KEYING (MSK) SIGNAL

RELATED PATENT APPLICATION

This application claims priority to commonly owned U.S. Provisional Patent Application Ser. No. 61/426,900; filed Dec. 23, 2010; entitled "Method For Digitally Demodulating a Minimum-Shift Keying (MSK) Signal," by József G. Németh and Peter Sz. Kovács; which is hereby incorporated by reference herein for all purposes.

TECHNICAL FIELD

The present disclosure relates to digital communications, and more particularly, to an advanced signal processing data path that allows recovering transmitting data bits from a minimum shift keying (MSK) modulated waveform signal, with high robustness against impairments of the analog radio and the propagation medium.

BACKGROUND

Low power wireless devices are becoming more prevalent and sophisticated. These new wireless devices require very fast transfer of data while minimizing current drain from a self contained battery. Bandwidth Efficient methods for transmission of data have been and continue to be of great importance to the data dependent community. A community that is experiencing exponential growth. Minimum Shift Keying (MSK) is a type of continuous-phase frequency-shift keying that was developed in the late 1950s and 1960s, see U.S. Pat. No. 2,977,417, entitled "Minimum-Shift Data Communication System," by Doelz et al., and incorporated by reference herein for all purposes. MSK is encoded with bits alternating between quadrature components, with the Q component delayed by half the symbol period. However, instead of square pulses as OQPSK uses, MSK encodes each bit as a half sinusoid. This results in a constant-modulus signal which reduces problems caused by non-linear distortion. In addition to being viewed as related to OQPSK, MSK can also be viewed as a continuous phase frequency shift keyed (CPFSK) signal with a frequency separation of one-half the bit rate.

Frequency modulation and phase modulation are closely related. A static frequency shift of +1 Hz means that the phase is constantly advancing at the rate of 360 degrees per second ($2\pi$ radians/second) relative to the phase of the unshifted signal. Likewise, a static frequency shift of −1 Hz means that the phase is constantly retarding at the rate of −360 degrees per second ($-2\pi$ radians/second) relative to the phase of the unshifted signal.

Since a frequency shift produces an advancing or retarding phase, frequency shifts can be detected by sampling phase at each symbol period. Phase shifts of $(2N+1)\pi/2$ radians are easily detected with an I/Q demodulator. At even numbered symbols, the polarity of the I channel conveys the transmitted data, while at odd numbered symbols the polarity of the Q channel conveys the data. This orthogonality between I and Q simplifies detection algorithms and hence reduces power consumption in a portable receiver. The minimum frequency shift which yields orthogonality of I and Q is that which results in a phase shift of $\pm\pi/2$ radians per symbol (90 degrees per symbol). The deviation must be accurate in order to generate repeatable 90 degree phase shifts. A phase shift of +90 degrees represents a data bit equal to "1", while −90 degrees represents a "0". The peak-to-peak frequency shift of an MSK signal is equal to one-half of the bit rate.

The MSK signal produces a constant envelope carrier (no carrier amplitude variations) which is not affected by amplification through a higher efficiency non-linear amplifier, e.g., class C amplifier. It is a spectrally efficient modulation scheme (see GMSK below), has good bit error rate (BER) performance and is self synchronizing. These are all desirable characteristics for improving the power efficiency of receivers and transmitters, especially those operated from a battery. Amplitude variations can exercise nonlinearities in an amplifier's amplitude-transfer function, generating spectral regrowth, a component of adjacent channel power. Therefore, more efficient amplifiers (which tend to be less linear) can be used with constant-envelope signals, thereby reducing power consumption. MSK has a narrower spectrum than wider deviation forms of frequency shift keying (FSK). The width of the spectrum is also influenced by the waveforms causing the frequency shift. If those waveforms have fast transitions or a high slew rate, then the spectrum of the transmitter will be broad. In practice, the waveforms are filtered with a Gaussian filter, resulting in a narrow spectrum. In addition, the Gaussian filter has no time-domain overshoot that would broaden the spectrum by increasing the peak deviation. MSK in combination with a Gaussian filter is termed GMSK (Gaussian MSK).

IEEE standard 802.15.4-2006 (Part 15.4: Wireless Medium Access Control (MAC) and Physical Layer (PHY) Specifications for Low-Rate Wireless Personal Area Networks (WPANs), incorporated by reference herein for all purposes, defines the protocol and compatible interconnection for data communication devices using low-data-rate, low-power, and low-complexity short-range radio frequency (RF) transmissions in a wireless personal area network (WPAN) at data transfer rates of up to a 250 kilobit/second (kb/s). However with increased demand for content rich wireless data transfer, 250 kb/s is not fast enough. Up to a two (2) megabit per second (Mb/s) wireless data rate is desired as a selectable option for increased data transfer in a IEEE standard 802.15.4 compatible wireless device. With the constraints of a given analog radio, achieving this requirement would not be possible without advanced digital signal processing techniques.

SUMMARY

Therefore, it is desired to produce a high performance two (2) Mb/s wireless radio link using MSK modulation and an IEEE 802.15.4 compatible radio module. This in turn requires the design of a high performance demodulation method that significantly improves on the simple non-coherent one.

According to the teachings of this disclosure the method processes a sampled stream of I-Q format MSK modulated symbols; receives the input through a three symbol wide sliding window; for each window position rates all the eight possible combinations of three modulating symbols as to the likelihood of being the source for the current, possibly impaired input waveform segment; computes the ratings from the I-Q waveform of the input as the linearly quantized outputs of a bank of matched filters; based on the fact that the ratings are related through the common symbols in the overlap of consecutive window positions, constructs a 4 state trellis and assigns the branch metrics from the ratings to represent the probabilistic relation between the sequence of ratings; and uses the trellis to drive a Viterbi decoder to recover (find the best estimate for) the data represented by the sequence of sampled I-Q format MSK symbols.

According to an embodiment, a method for digitally demodulating a minimum-shift keying (MSK) signal may method comprise the steps of: receiving a sequence of sampled I-Q format MSK symbols; processing three symbols at a time of the received sequence of sampled I-Q format MSK symbols, selected by using a sliding window; rating all eight possible combinations of three modulating symbols as to the likelihood of being a source for a currently processed and possibly impaired input waveform segment; computing the ratings from the I-Q waveform of the three input symbols by a bank of matched filters; defining a trellis that represents a probabilistic relationship within a sequence of ratings based on ratings that are related through common symbols in an overlap of consecutive window positions; and using the trellis to drive a Viterbi decoder to find a best estimate for each of the individual modulating symbols.

According to a further embodiment of the method, the step of selecting the three consecutive MSK symbols is done with a sliding three symbol window. According to a further embodiment of the method, the step of rating hypotheses for each combination of the three consecutive MSK symbols is done with the linearly quantized outputs of a bank of matched filters each filter covering one of the eight possible combination of three consecutive MSK symbols.

According to a further embodiment of the method, the trellis is constructed from four (4) memory states corresponding to the four (4) possible combination of two (2) MSK symbols and the computed ratings are assigned as branch metrics to the transitions between the memory states such that they represent the probabilistic relationship between them as established by the three symbol sliding window. According to a further embodiment of the method, the constructed trellis is used in the Viterbi algorithm to find the best estimate for the data represented by the sequence of sampled I-Q format MSK symbols.

According to a further embodiment of the method, the ADC is a one (1) bit ADC. According to a further embodiment of the method, the one (1) bit ADC output is fed through a decimating filter producing four (4) in-phase (I) bits and four (4) quadrature phase (Q) bits.

According to another embodiment, an apparatus for digitally demodulating a minimum-shift keying (MSK) signal may comprise: an analog-to-digital converter (ADC) for sampling the MSK signal and converting the sampled MSK signal into a plurality of digital representations thereof; a down-conversion filter for decimating the digital representations of the sampled data signals and converting the decimated digital representations of the sampled data signals to in-phase (I) and quadrature phase (Q) MSK symbols; a three MSK symbol window for selecting three consecutive MSK symbols; a matched filter bank for rating hypotheses for each combination of the selected three consecutive MSK symbols; and a Viterbi decoder for selecting a highest rated hypothesis for the combination of the three consecutive MSK symbols and to provide a most likely logic level for each of the selected three consecutive MSK symbols.

According to a further embodiment, the MSK signal is frequency translated in a frequency mixer down to a zero intermediate frequency (IF) before the MSK signal is sampled. According to a further embodiment, the ADC is a one (1) bit ADC. According to a further embodiment, the down-conversion filter decimates the one (1) bit ADC output to four (4) in-phase (I) bits and four (4) quadrature phase (Q) bits. According to a further embodiment, the three symbol window is a sliding three symbol window. According to a further embodiment, the matched filter bank comprises eight linearly quantized filters configured to rate the hypotheses for each combination of the selected three consecutive MSK symbols.

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

This disclosure presents a method and apparatus for demodulating and decoding an MSK signal stream from its sampled and digitized I-Q representation contaminated by noise during transmission and distorted by impairments accumulated while processed internally in the initial stages of a wireless transceiver. The method and apparatus is generally applicable, numeric data, if needed, however, relate to the example embodiment presented on FIG. 1.

Figure 1:
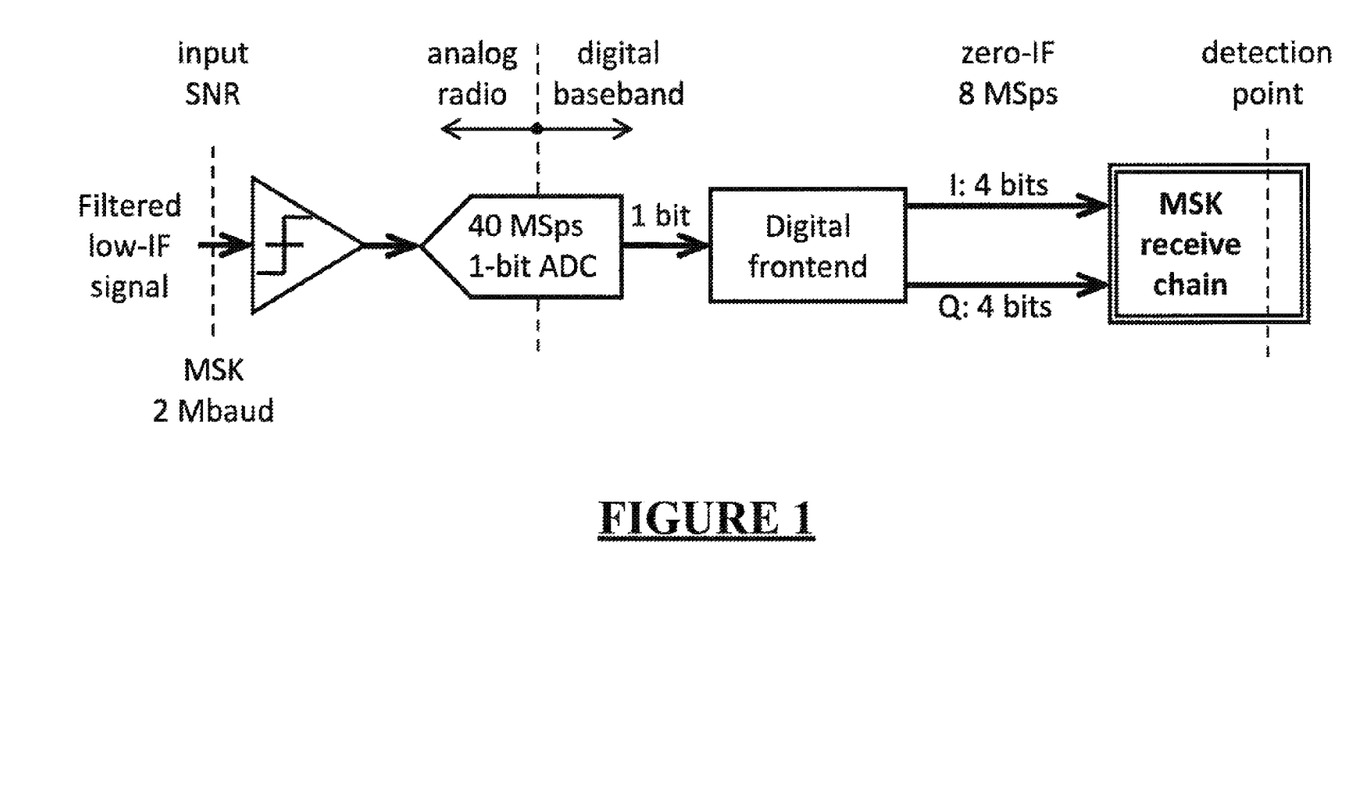
FIG. 1 illustrates a schematic block diagram of a wireless MSK receiver coupled to a digital processor, according to a specific example embodiment of this disclosure.
Figure 2:
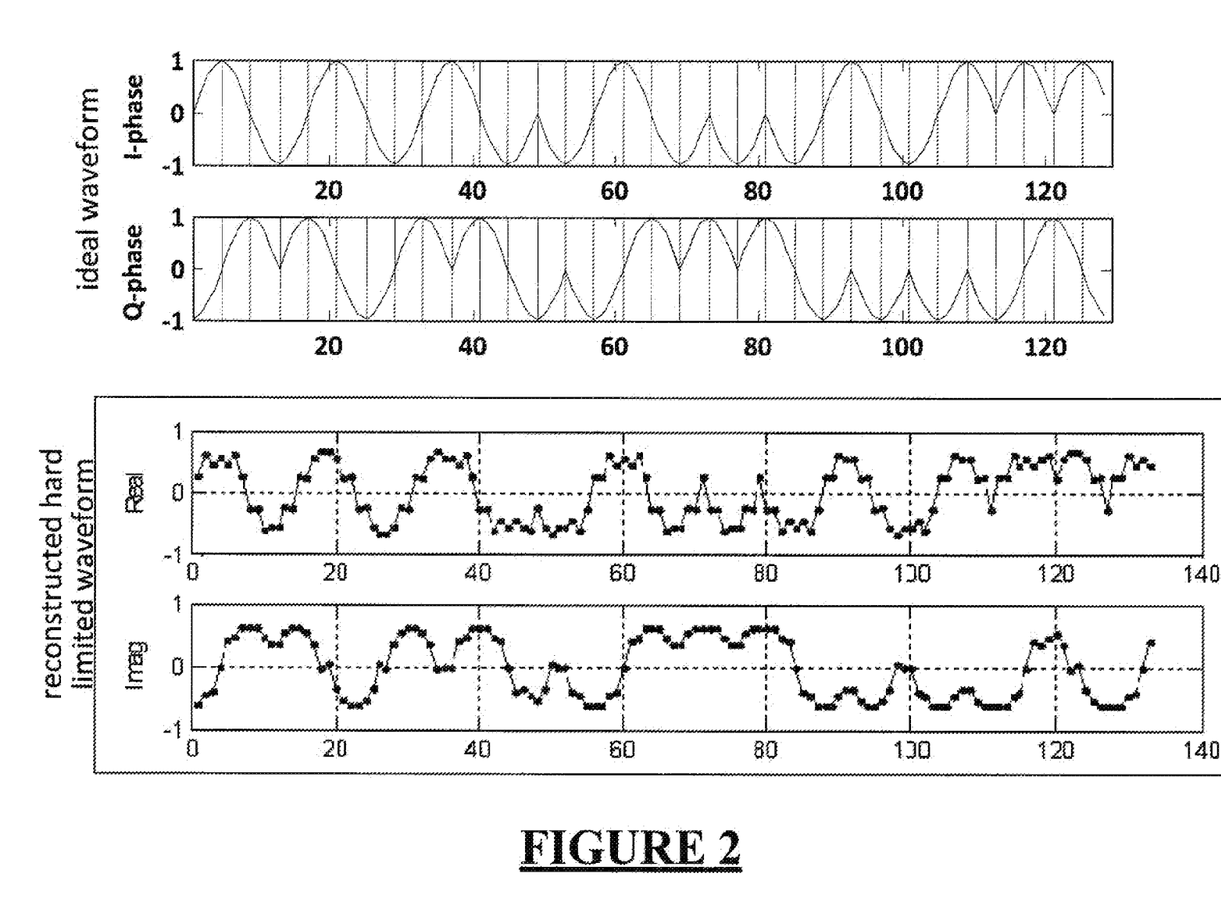
FIG. 2 illustrates schematic waveform diagrams of an ideal MSK I-Q signal and the samples thereof as input to the MSK receive chain in the wireless receiver shown on FIG. 1.

As shown in FIG. 1 the analog radio does not directly provide the I-Q samples to the MSK receive chain, the subject of this disclosure. Rather it subjects its internally available filtered low-IF signal to high-gain, hard-limiting amplification, passes the result through a 1-bit ADC (threshold comparator) and presents a sampled bit stream at the output. A digital signal processing front-end is thus required to recover the I-Q representation. The arrangement reduces power consumption, an important consideration in mobile wireless transceivers, by eliminating the multi-bit I-Q AD converters, but introduces signal impairments even in the ideal, noiseless case, as signified by the example waveforms of FIG. 2. Additionally, the receive channel ceases to be linear, thus standard noise reduction algorithms, filtering, cannot be used effectively in further processing.

Figure 3:
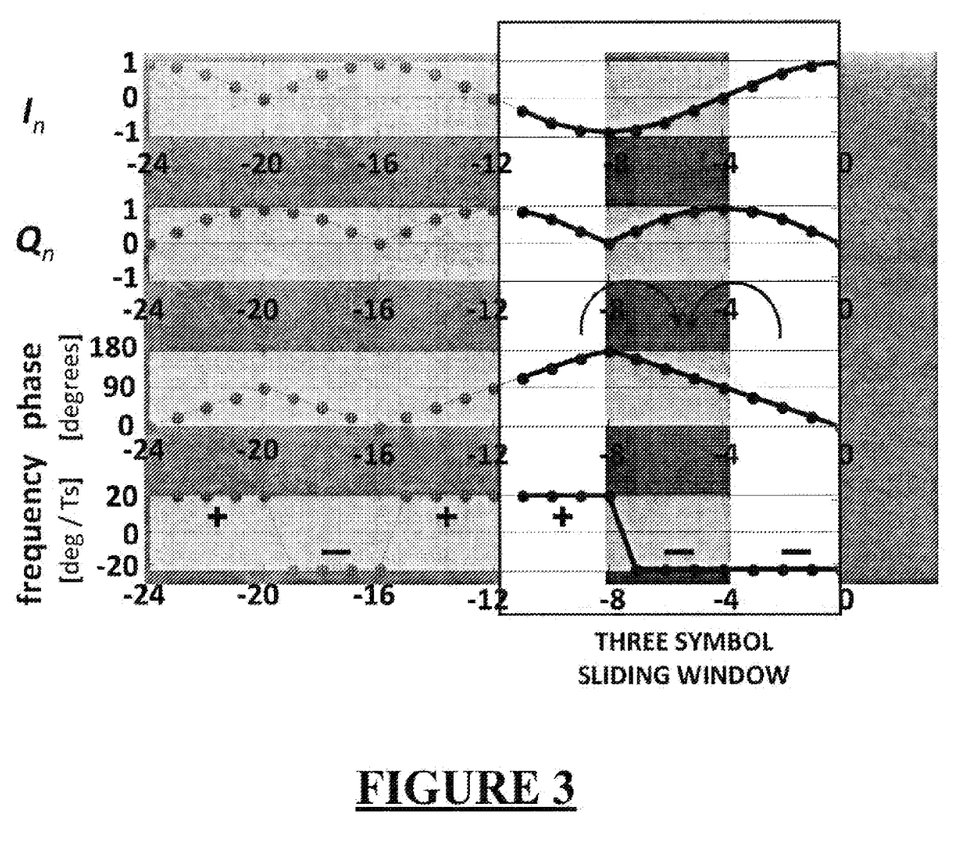
FIG. 3 illustrates schematic waveform diagrams of a plurality of MSK symbols with a sliding window over three of the MSK symbols, according to the teachings of this disclosure.

The phase curve of an MSK modulated sequence consists of linear segments between the symbol boundaries. Each segment starts continuously from the value reached at the end of the previous symbol and changes ±90° (wrapped back into the ±180° band when necessary) depending on the current modulating symbol. If we consider a part of the phase curve over three consecutive symbols, as we do in FIG. 3, it is obvious that the middle segment, and consequently the corresponding modulating symbol, is completely determined by the other two.

The above deterministic relationship among three consecutive segments of the phase curve becomes a probabilistic one when any or all of these computed phase segments may be in error. In this case, one has to fall back on hypothesis testing. We have eight possible modulating sequences of three symbols, from +++ to ---, together with the corresponding ideal I, Q and phase waveforms. Hypothesis testing assigns scores to each of the combinations in proportion to the likelihood that the combination in question may have produced the current but by now impaired three symbol input segment. One way to accomplish it is by 'comparing the ideal waveforms to the actually received ones'. The winning hypothesis may then select the value for any or all the modulating symbols in the sequence.

Figure 4:
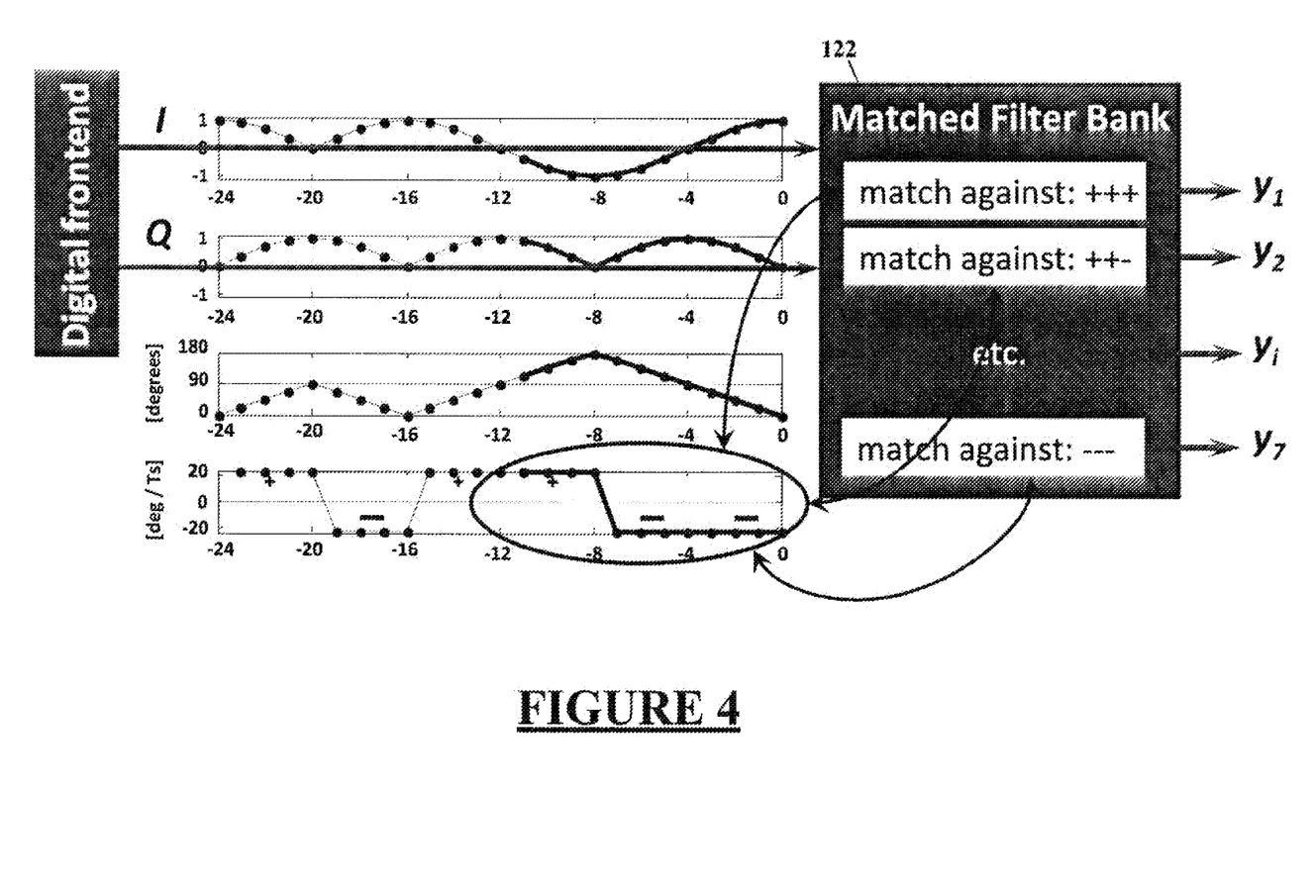
FIG. 4 illustrates a schematic waveform and the block diagram of a matched filter bank matching the received samples against all possible combinations of three sequential MSK symbols, according to the teachings of this disclosure.

As shown in the example on FIG. 4, a matched filter bank on the I and Q waveforms produces the scores by executing the matches in parallel and taking the magnitude of the results. Instead, the phase curve computed from the input signal, through a potentially different function, can also be used. The two approaches are different embodiments of the same method thus both are covered by this disclosure.

On FIG. 4 it is also evident that if a three symbol wide window slides over the received waveforms then the step-by-step hypothesis tests are not independent: all modulating symbols contribute to three consecutive hypothesis testing. In turn this establishes a longer term dependency that can be exploited by driving a Viterbi decision process with the output of the individual hypothesis tests.

Figure 5:
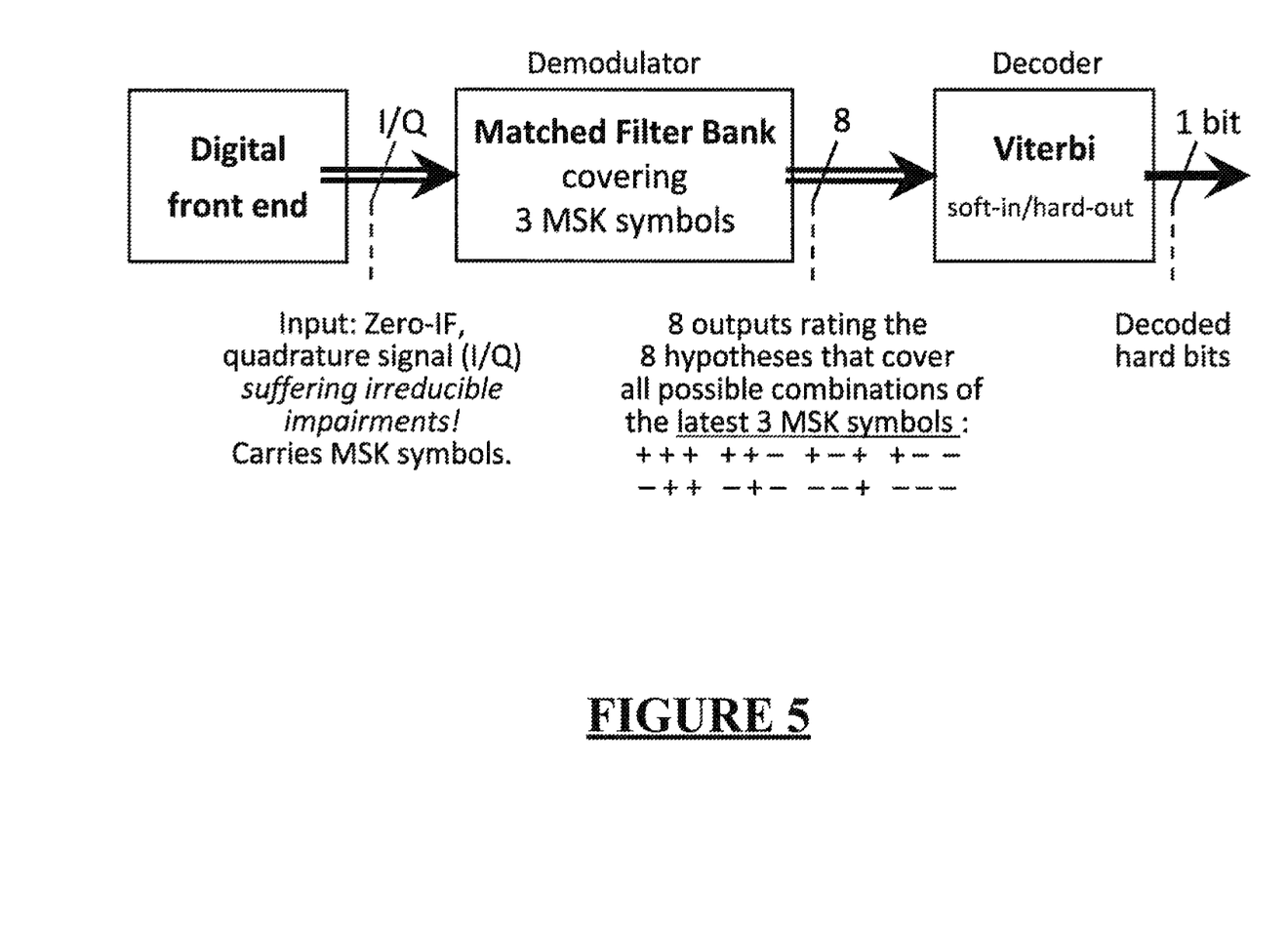
FIG. 5 illustrates a conceptual arrangement for the digital MSK receive chain.
Figure 6:
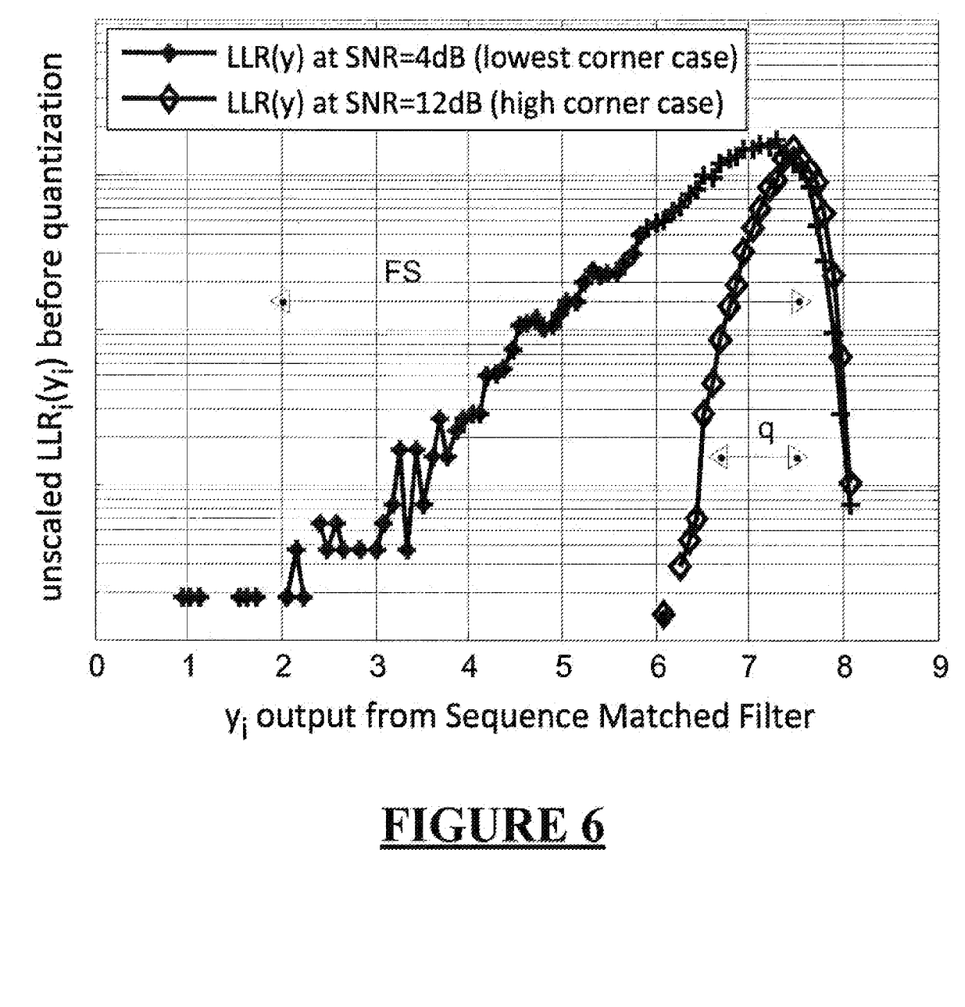
FIG. 6 illustrates the experimental result that validates the use of the outputs of the matched filter bank as the log-likelihood-ratios in the Viterbi decision process.

FIG. 5 presents the arrangement that realizes this potential. The question that arises is whether the linearly quantized magnitudes of the outputs ($y_i$) of the sequential matched filter bank can be used directly in the trellis for the Viterbi algorithm. As simulation results, presented on FIG. 6, show they are approximately linearly related to the log-likelihood-ratios ($LLR_i$)

$$LLR_i = \log\left(\frac{Pb(H_i \mid y_i)}{sup\{Pb(H_{j \neq i} \mid y_i): j \notin 0, 1, \ldots, 7\}}\right) \sim y_i + const.$$

in the signal-to-noise (SNR) region of interest. Hence, the linearly quantized magnitudes, $y_i$, of the outputs of the filter can directly feed the Viterbi decoder with branch metrics so that the accumulated path metrics approximate the log-likelihood-ratios of each of the hypothetical sequences.

Figure 7:
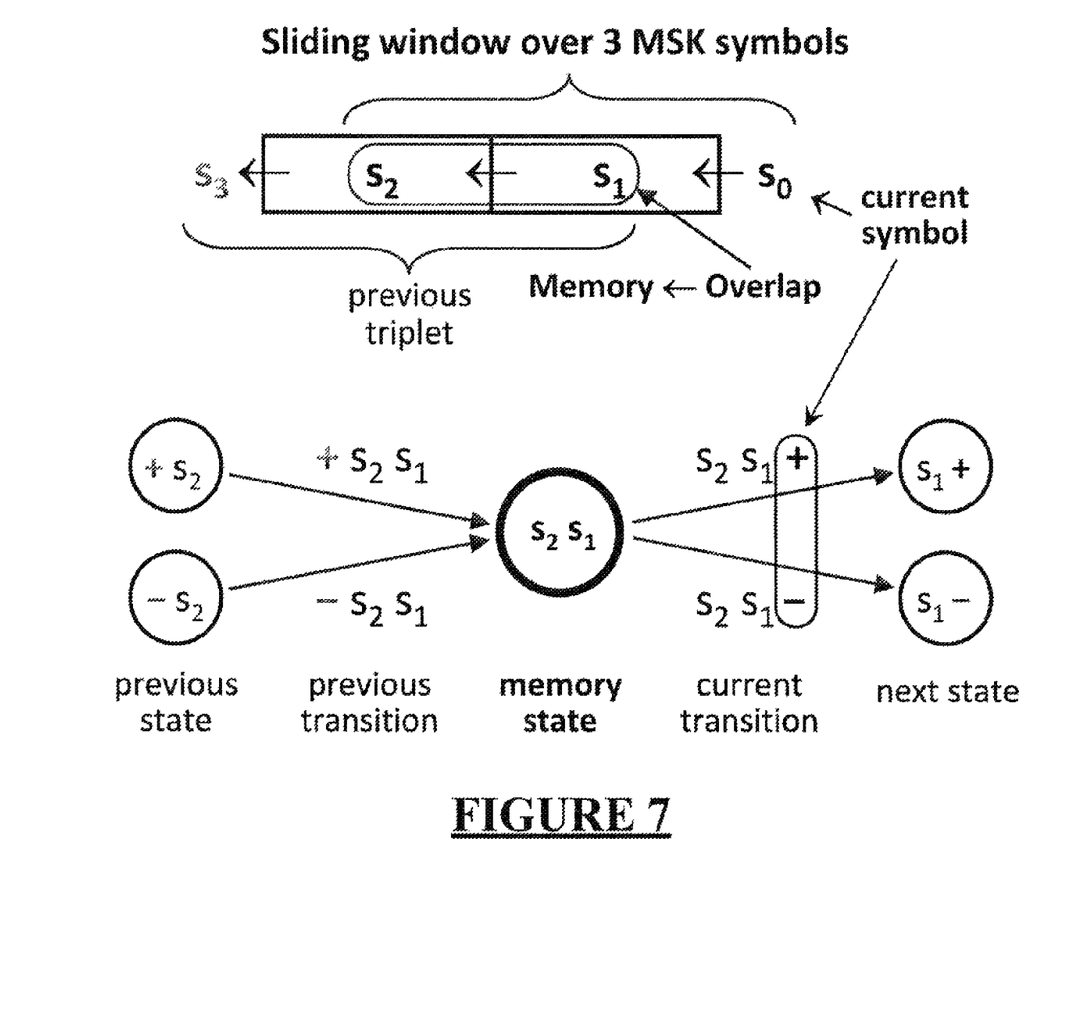
FIG. 7 illustrates a sliding window comprising three of a plurality of sequential MSK symbols and the building block of a trellis diagram thereof, according to the teachings of this disclosure.
Figure 8:
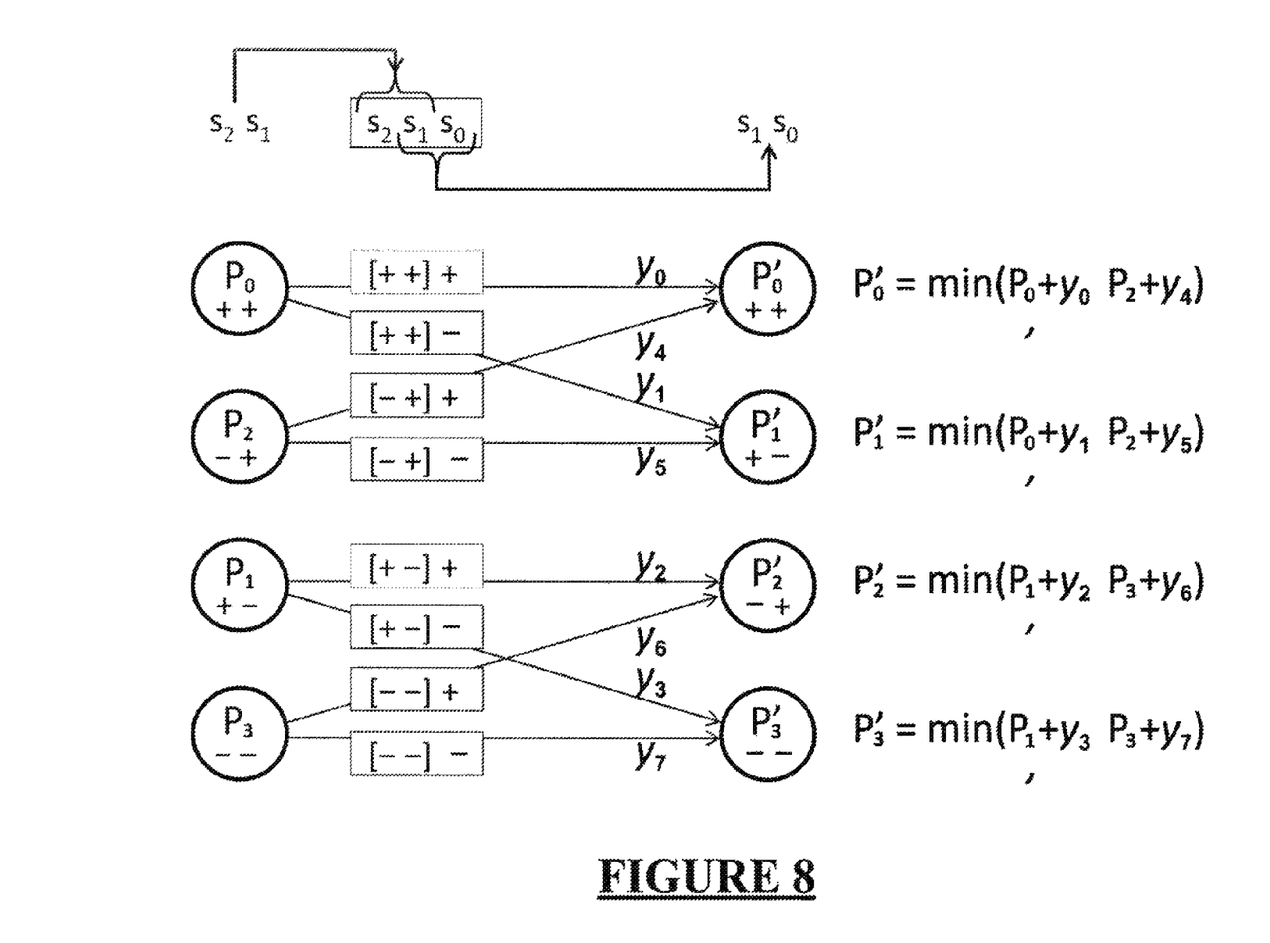
FIG. 8 illustrates graphical details of a slice of the trellis diagram for the Viterbi decision process used in determining the received MSK symbols, according to the teachings of this disclosure.

The construction of the trellis driving the Viterbi algorithm is presented on FIGS. 7 and 8. FIG. 7 defines the memory states, labeled with ordered pairs of the modulating symbols, and shows the general construction of state transitions occurring when the three symbol window slides into the next position. FIG. 8 completes the construction by specifying all possible states, state transitions and the assignment of the quantized matched filter bank outputs to the state transitions. (The add-compare-select rules that follow from the construction are also shown.) What is left undefined is the trace-back length of the Viterbi algorithm. In the case exemplified on FIG. 1 it is set to be 4.

Figure 9:
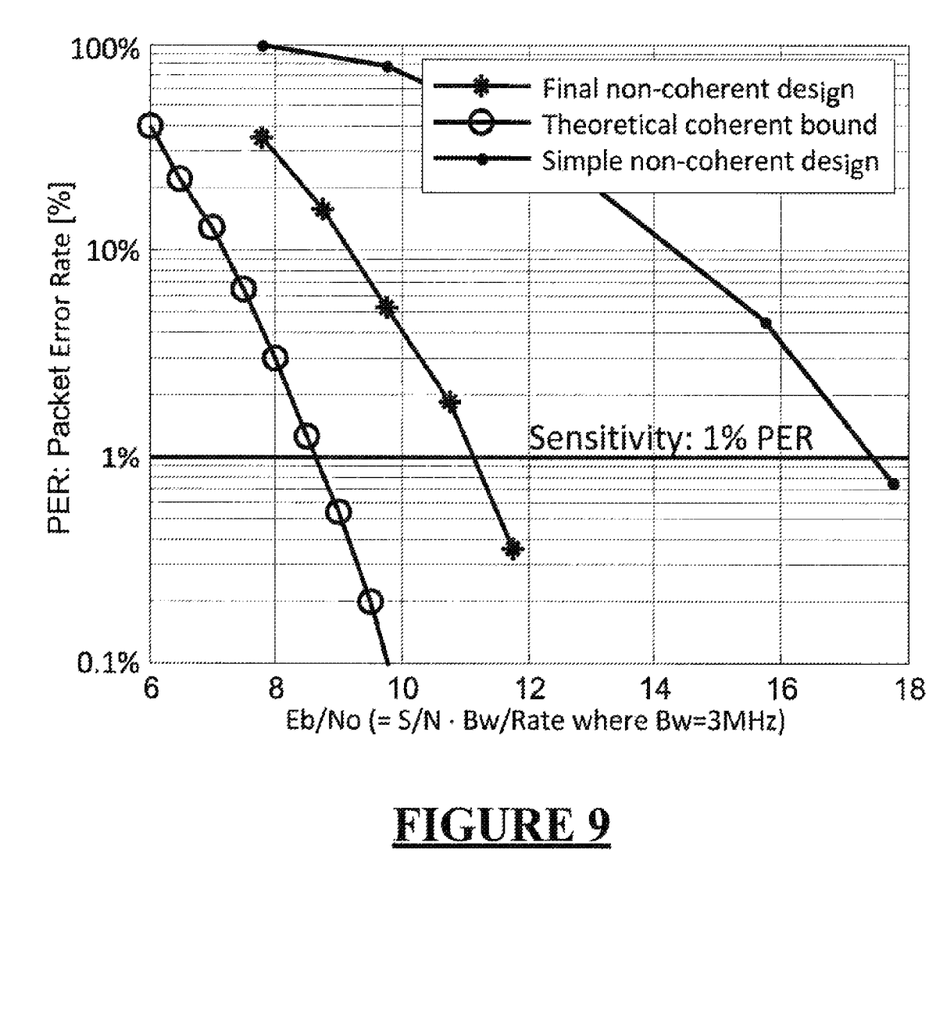
FIG. 9 illustrates a graphical plot of performance characteristics, according to the teachings of this disclosure.

FIG. 9 depicts the performance, PER vs. Eb/No, of the method implemented within the receiver of FIG. 1. At 1% PER it gains 6 dB over the straight non-coherent design and comes ~2.5 dB close to the theoretical bound. If we take into account the implementation loss—~1.5 dB in the radio (ISI from filters, hard limiting) and ~1 dB in the digital part (AFC inaccuracy, limited fixed point precision)—then the method achieves the practical optimum.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for digitally demodulating a minimum-shift keying (MSK) signal, said method comprising the steps of:
   receiving a sequence of sampled I-Q format MSK symbols;
   processing three symbols at a time of the received sequence of sampled I-Q format MSK symbols, selected by using a sliding window;
   rating all eight combinations of the three symbols as to provide an estimation of being a source for a currently processed and impaired input waveform segment;
   computing the ratings from an I-Q waveform of the three symbols by a bank of matched filters;
   defining a trellis that represents a probabilistic relationship within a sequence of ratings based on ratings that are related through common symbols in an overlap of consecutive window positions; and
   using the trellis to drive a Viterbi decoder to find a best estimate for each symbol of the three symbols.

2. The method according to claim 1, wherein the step of selecting the three consecutive MSK symbols is done with a sliding three symbol window.

3. The method according to claim 1, wherein the step of rating hypotheses for each combination of the three consecutive MSK symbols is done with the linearly quantized outputs of a bank of matched filters each filter covering one of the eight possible combination of three consecutive MSK symbols.

4. The method according to claim 3, wherein the trellis is constructed from four (4) memory states corresponding to the four (4) possible combination of two (2) MSK symbols and the computed ratings are assigned as branch metrics to the transitions between the memory states such that they represent the probabilistic relationship between them as established by the three symbol sliding window.

5. The method according to claim 4 wherein the constructed trellis is used in the Viterbi algorithm to find the best estimate for the data represented by the sequence of sampled I-Q format MSK symbols.

6. The method according to claim 1, wherein the ADC is a one (1) bit ADC.

7. The method according to claim 6, wherein the one (1) bit ADC output is fed through a decimating filter producing four (4) in-phase (I) bits and four (4) quadrature phase (Q) bits.

8. An apparatus for digitally demodulating a minimum-shift keying (MSK) signal, comprising:
- an analog-to-digital converter (ADC) for sampling the MSK signal and converting the sampled MSK signal into a plurality of digital representations thereof;
- a down-conversion filter for decimating the digital representations of the sampled data signals and converting the decimated digital representations of the sampled data signals to in-phase (I) and quadrature phase (Q) MSK symbols;
- a three MSK symbol window for selecting three consecutive MSK symbols;
- a matched filter bank for rating hypotheses for each combination of the selected three consecutive MSK symbols; and
- a Viterbi decoder for selecting a highest rated hypothesis for the combination of the three consecutive MSK symbols and to provide a logic level for each of the selected three consecutive MSK symbols.

9. The apparatus according to claim 8, wherein the MSK signal is frequency translated in a frequency mixer down to a zero intermediate frequency (IF) before the MSK signal is sampled.

10. The apparatus according to claim 8, wherein the ADC is a one (1) bit ADC.

11. The apparatus according to claim 10, wherein the down-conversion filter decimates the one (1) bit ADC output to four (4) in-phase (I) bits and four (4) quadrature phase (Q) bits.

12. The apparatus according to claim 8, wherein the three symbol window is a sliding three symbol window.

13. The apparatus according to claim 8, wherein the matched filter bank comprises eight linearly quantized filters configured to rate the hypotheses for each combination of the selected three consecutive MSK symbols.

* * * * *